United States Patent
Kittilä et al.

(10) Patent No.: US 11,189,414 B2
(45) Date of Patent: Nov. 30, 2021

(54) CHOKE

(71) Applicant: ABB Schweiz AG, Baden (CH)

(72) Inventors: Jukka-Pekka Kittilä, Helsinki (FI); Vesa Palojoki, Helsinki (FI); Asko Rantanen, Helsinki (FI)

(73) Assignee: ABB Schweiz AG, Baden (CH)

( * ) Notice: Subject to any disclaimer, the term of this patent is extended or adjusted under 35 U.S.C. 154(b) by 396 days.

(21) Appl. No.: 16/189,144

(22) Filed: Nov. 13, 2018

(65) Prior Publication Data

US 2019/0148048 A1    May 16, 2019

(30) Foreign Application Priority Data

Nov. 10, 2017 (EP) .................................. 17201067

(51) Int. Cl.
    *H01F 17/06*      (2006.01)
    *H01F 27/34*      (2006.01)
    (Continued)

(52) U.S. Cl.
    CPC ............. *H01F 17/062* (2013.01); *H01F 3/14* (2013.01); *H01F 27/2847* (2013.01);
    (Continued)

(58) Field of Classification Search
    CPC .... H01F 17/06; H01F 17/062; H01F 27/2823; H01F 27/2895; H01F 27/346; H01F 30/16; H01F 2038/305
    (Continued)

(56) References Cited

U.S. PATENT DOCUMENTS

| 4,536,733 | A | * | 8/1985 | Shelly | ..................... H01F 27/06 336/182 |
| 4,649,639 | A | * | 3/1987 | Mas | ........................ H01F 27/25 29/605 |

(Continued)

FOREIGN PATENT DOCUMENTS

| CN | 103124140 A | | 5/2013 | |
| DE | 4027994 A1 | * | 3/1992 | ........... H01F 17/062 |

(Continued)

OTHER PUBLICATIONS

European Patent Office, Search Report issued in corresponding Application No. 17201067.0, dated May 22, 2018, 2 pp.

(Continued)

*Primary Examiner* — Tszfung J Chan
(74) *Attorney, Agent, or Firm* — Leydig, Voit & Mayer, Ltd.

(57) ABSTRACT

A choke comprising a magnetic core having a centre line that forms a closed loop, the choke has a choke axis around which the magnetic core is located, and a coil wound around the magnetic core, the coil has a plurality of turns, each of the turns has a width perpendicular to lengthwise direction of the turn, and a thickness perpendicular to both lengthwise direction of the turn and the width. The coil has a cross-section whose shape varies along lengthwise direction of the coil, such that each turn has an inner portion and an outer portion whose width is substantially greater than width of the inner portion, the outer portion is located further from the choke axis than the inner portion.

17 Claims, 2 Drawing Sheets

(51) Int. Cl.
*H01F 27/28* (2006.01)
*H01F 37/00* (2006.01)
*H01F 3/14* (2006.01)
H02M 1/44 (2007.01)
H01F 27/02 (2006.01)
H01F 27/24 (2006.01)

(52) U.S. Cl.
CPC ....... *H01F 27/2895* (2013.01); *H01F 27/346* (2013.01); *H01F 37/00* (2013.01); H01F 27/02 (2013.01); H01F 27/022 (2013.01); H01F 27/24 (2013.01); H01F 27/2823 (2013.01); H02M 1/44 (2013.01)

(58) Field of Classification Search
USPC .................................................. 336/200, 232
See application file for complete search history.

(56) References Cited

U.S. PATENT DOCUMENTS

| | | | | |
|---|---|---|---|---|
| 4,943,902 A | * | 7/1990 | Severinsky | H02M 1/4225 363/80 |
| 5,165,162 A | * | 11/1992 | Charles | H01F 17/062 29/605 |
| 5,211,767 A | * | 5/1993 | Shigeta | C22C 45/02 148/121 |
| 6,058,078 A | * | 5/2000 | Ishiguro | G11B 23/505 361/267 |
| 7,274,576 B1 | * | 9/2007 | Zargari | H02M 1/44 363/35 |
| 8,537,575 B2 | | 9/2013 | Xiao et al. | |
| 2004/0017689 A1 | | 1/2004 | Zhang et al. | |
| 2005/0007232 A1 | * | 1/2005 | Ono | H01F 41/005 336/213 |
| 2007/0090916 A1 | * | 4/2007 | Rao | H01F 17/062 336/229 |
| 2008/0080106 A1 | * | 4/2008 | Mirafzal | H02M 1/12 361/42 |
| 2009/0146769 A1 | * | 6/2009 | Feng | H01F 27/22 336/90 |
| 2015/0213938 A1 | * | 7/2015 | Sakaguchi | B65D 25/108 336/96 |
| 2016/0372259 A1 | * | 12/2016 | Banba | H01F 17/062 |
| 2017/0092415 A1 | | 3/2017 | Banba et al. | |

FOREIGN PATENT DOCUMENTS

| | | | | |
|---|---|---|---|---|
| WO | | 2015164871 A1 | 10/2015 | |
| WO | | WO-2015164871 A1 | * 10/2015 | ......... H01F 1/15333 |

OTHER PUBLICATIONS

Chinese Patent Office, Office Action issued in corresponding Application No. 201811312164.2, dated Aug. 3, 2020, including English language summary of Office Action, 11 pp.

* cited by examiner

CHOKE

FIELD OF THE INVENTION

The present invention relates to a choke comprising a magnetic core and a coil wound around the magnetic core, the choke being adapted to block high frequency alternating current in an electrical circuit, while passing low frequency or direct current.

When current passing through a choke is direct current or low frequency alternating current, majority of losses of the choke is caused by resistance of a coil of the choke. One of the problems associated with known chokes is that their coils have high resistance. In many cases, enlarging cross-section of a known coil is not possible due to lack of space.

BRIEF DESCRIPTION OF THE INVENTION

An object of the present invention is to provide a choke so as to solve the above problem. The objects of the invention are achieved by a choke which is characterized by what is stated in the independent claim 1. The preferred embodiments of the invention are disclosed in the dependent claims.

The invention is based on the idea of providing a choke with a closed loop magnetic core, and a coil having a cross-section whose shape varies along lengthwise direction of the coil, such that each turn of the coil has a narrow inner portion and a wide outer portion, wherein the narrow inner portion is located closer to a centre point of the choke than the wide outer portion.

An advantage of a choke of the invention is that resistance of the coil is lower than resistance of a coil in a known choke having the same size. Alternatively, a choke of the invention can be designed smaller than a corresponding known choke with the same coil resistance. It can be said that space utilization of a choke of the invention is better than space utilization of a known choke. The good space utilization also means that volume of the magnetic core of the choke can be designed greater than volume of a magnetic core of a known choke having the same size. Further, a coil of a choke according to the invention has a large surface area which facilitates cooling of the coil.

In an embodiment a choke according to the invention is used as a direct current choke of a converter assembly. In an alternative embodiment a choke according to the invention is used as an alternating current choke of a converter assembly.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
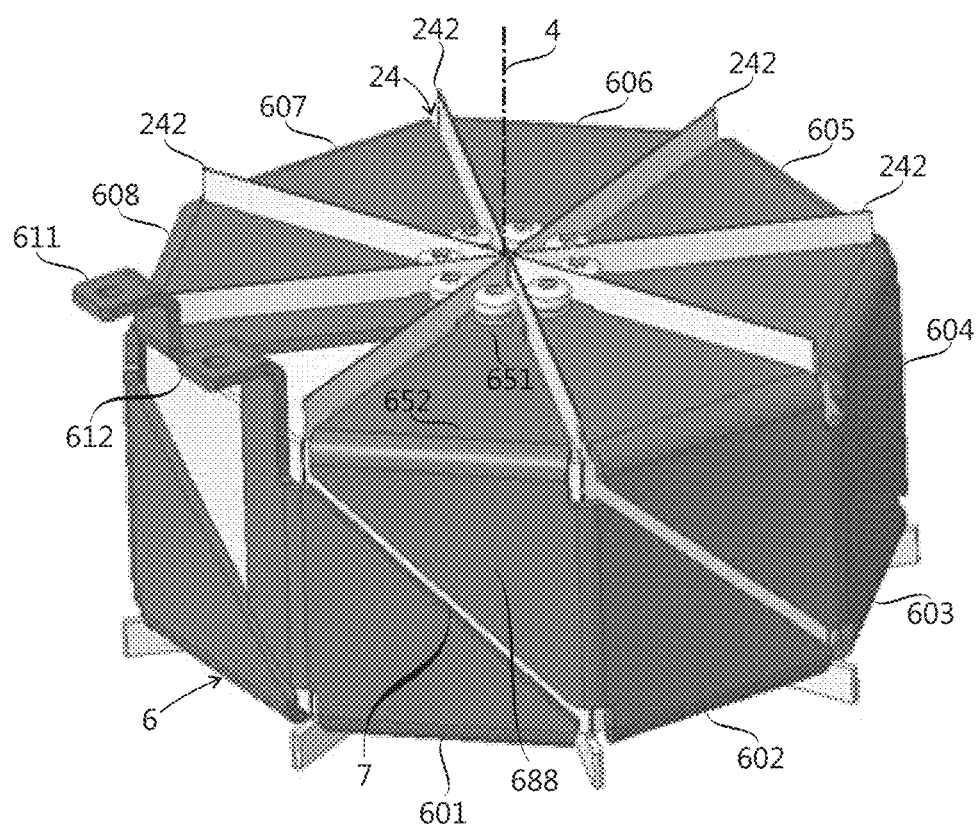
FIG. 1 shows a choke according to an embodiment of the invention.
Figure 2:
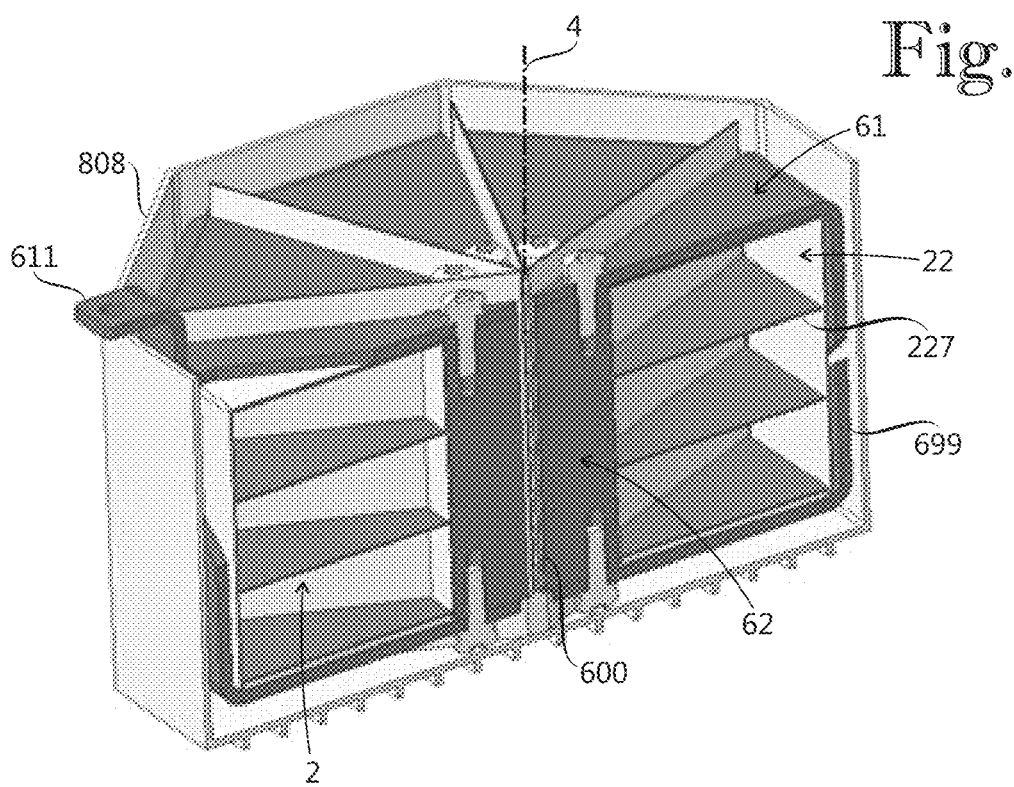
FIG. 2 shows internal structure of the choke of FIG. 1.

FIG. 1 shows a choke comprising a magnetic core and a coil 6 wound around the magnetic core. The choke of FIG. 1 is a single-phase toroidal choke. FIG. 2 shows internal structure of the choke of FIG. 1. In FIG. 2, the choke has been cut in half, some parts of the magnetic core have been removed, and an outer casing 808 has been added. The magnetic core 2 comprises magnetic material with a high magnetic permeability. Herein high magnetic permeability is greater than or equal to $5 \cdot 10^{-5}$ H/m. The magnetic core 2 is adapted to confine and guide magnetic field of the choke. The magnetic core 2 is electrically insulated from the coil 6.

The magnetic core 2 forms a closed loop. Hence the magnetic core 2 has a centre line that forms a closed loop. The centre line of the magnetic core 2 is an imaginary line passing through the magnetic core 2. During operation of the choke, a theoretical centre of magnetic field inside the choke substantially coincides with the centre line of the magnetic core 2.

The choke has a choke axis 4 around which the magnetic core 2 is located. The choke axis 4 is an imaginary axis which extends perpendicular to the closed loop formed by the centre line of the magnetic core 2. During operation of the choke, a magnetic field of the choke encircles the choke axis 4. The choke axis 4 traverses through a midpoint of the choke which is also a geometrical midpoint of the closed loop formed by the centre line.

The coil 6 is made of material having high electrical conductivity. Herein high electrical conductivity is greater than or equal to $5 \cdot 10^{6}$ S/m. The coil 6 has a first terminal 611 and a second terminal 612. The coil 6 has eight turns denoted with reference signs 601 to 608. Each of the turns 601 to 608 has a width perpendicular to lengthwise direction of the turn, and a thickness perpendicular to both lengthwise direction of the turn and the width. The turns 601 to 608 are located in a single layer such that the turns 601 to 608 do not overlap with each other.

The coil 6 is basically an insulated conductor which is insulated such that a current can flow from the first terminal 611 to the second terminal 612 only by travelling through the entire length of the coil 6. A general structure of a choke, including the way in which a coil of a choke is insulated is well known in the art, and therefore this aspect is not discussed in detail herein.

Number of turns in a coil of a choke is not limited to eight present in the embodiment of FIG. 1. A choke according to present invention comprises a coil which has a plurality of turns. In an embodiment number of turns in the coil is four. In another embodiment number of turns in the coil is fourteen.

In an embodiment the coil of the choke is made of copper. In an alternative embodiment the coil of the choke is made of aluminium.

The coil 6 has a cross-section whose shape varies along lengthwise direction of the coil 6, such that each turn of the coil 6 has an inner portion 651 and an outer portion 652 whose width is substantially greater than width of the inner portion 651. The cross-section of the coil 6 is an intersection of the coil 6 with a plane perpendicular to the lengthwise direction of the coil 6. The outer portion 652 is located further from the choke axis 4 than the inner portion 651. The lengthwise direction of the coil 6 is a nonlinear direction that leads from the first terminal 611 to the second terminal 612.

The width of the outer portion 652 is more than double compared with the width of the inner portion 651. Further, the width of the outer portion 652 is approximately twentyfold compared with a thickness of the outer portion 652. In an alternative embodiment a width of an outer portion of a turn is at least fourfold compared with thickness of the outer portion. A thickness of a turn is a dimension perpendicular to both lengthwise direction of the turn and width of the turn. Lengthwise direction of a turn is a nonlinear direction coinciding with lengthwise direction of a coil.

Each turn of the coil 6 comprises a first coil section 61 and a second coil section 62. The first coil sections 61 and the second coil sections 62 alternate along lengthwise direction of the coil 6 such that successive coil sections are electrically conductively connected to each other. Cross-section of the first coil sections 61 have a different shape than cross-section of the second coil sections 62.

Cross-section of the first coil section 61 has generally a form of a rectangle, and cross-section of the second coil section 62 has generally a form of a triangle. Radially innermost portion of the first coil section 61 has a triangular form such that it covers the triangular end of the second coil section 62. In an alternative embodiment cross-section of a second coil section has generally a form of a truncated triangle, wherein a vertex adjacent the choke axis has been truncated. The second coil section 62 of each turn is located adjacent the choke axis 4, and extends substantially parallel to the choke axis 4.

Selecting a cross-section for a second coil section is basically an optimization process between electrical resistance and manufacturing costs. In an alternative embodiment cross-section of a second coil section has generally a form of a circle. In a further alternative embodiment cross-section of a second coil section has generally a form of a hexagon. Commercially available copper bars have often circular cross-sections or hexagon shaped cross sections. Therefore selecting a circular shape or a hexagon shape is in many cases the most cost-effective alternative.

Each first coil section 61 has been manufactured by cutting a piece from sheet material, and subsequently bending the piece into an appropriate form. Each second coil section 62 has been manufactured by cutting a piece of an appropriate length from a bar having a triangular cross-section.

A radial distance between the choke axis 4 and an outermost portion 699 of the coil 6 is more than twentyfold compared with radial distance between the choke axis 4 and an innermost portion 600 of the coil 6, wherein the radial distance is perpendicular to the choke axis 4. Consequently, a coil window of the choke is small. Herein, the coil window is an area around the choke axis 4 into which the turns of the coil 6 do not extend. The smaller the coil window, the better space utilization of the choke. In an alternative embodiment a radial distance between the choke axis and an outermost portion of the coil is at least tenfold compared with radial distance between the choke axis and an innermost portion of the coil.

The innermost portion 600 of the coil 6 comprises portions of the first coil sections 61, and portions of the second coil sections 62. The outermost portion 699 of the coil 6 is formed by portions of the first coil sections 61. The first terminal 611 and the second terminal 612 are not taken into account when defining the outermost portion 699 of the coil. Although the first terminal 611 and the second terminal 612 are integral with corresponding first coil sections 61 and bent from the same piece of sheet material, the first terminal 611 and the second terminal 612 are ignored when defining dimensions of the coil 6.

In the embodiment of FIG. 1, successive coil sections are electrically conductively connected to each other by screw connections. Each second coil section 62 is connected at a first axial end thereof to one first coil section 61 by a screw connection, and at a second axial end thereof to another first coil section 61 by another screw connection. A screw of each screw connection extends parallel to the thickness of the first coil section 61, and parallel to a longitudinal direction of the second coil section 62, wherein the longitudinal direction is perpendicular to the triangular cross-section of the second coil section 62.

In an alternative embodiment successive coil sections are electrically conductively connected to each other by another type of detachable connections. In a further alternative embodiment successive coil sections are electrically conductively connected to each other by fixed connections such as weld connections, clench connections, solder connections or riveted connections.

The magnetic core 2 has a plurality of core segments 22, and a plurality of core gaps 24. Permeability of material of the core segments 22 is at least tenfold compared to permeability of material of the core gaps 24. Each of the plurality of core gaps 24 is located between adjacent core segments 22 in the direction of the centre line. Each of the plurality of core gaps 24 comprises an intermediate sheet 242 which defines a gap plane between adjacent core segments 22, the centre line intersects each gap plane such that at the intersection the centre line is parallel to a normal of the gap plane.

Each core segment 22 has a general form of a wedge. A cross-section of each core segments 22 taken along a plane parallel to the choke axis has generally a form of a rectangle. The core segments 22 are identical between each other.

Each core segment 22 is a laminated core segment, made of stack of thin sheets of steel in order to reduce eddy current losses in the magnetic core 2. In FIG. 2 only few sheets 227 of steel are depicted in order to show thinness of the sheets 227. Due to the fact that FIG. 2 illustrates a choke cut in half, the sheets 227 shown in FIG. 2 are halves of real sheets of steel. In an alternative embodiment magnetic core is a laminated magnetic core made of stacks of sheets comprising another magnetic material.

Each intermediate sheet 242 is made of plastic. In an alternative embodiment intermediate sheets are made of another material having low permeability.

Each intermediate sheet 242 is a thin sheet whose thickness is less than three millimetres. Thickness of the intermediate sheet 242 is less than thickness of the first coil section 61.

Number of the core segments 22 is equal to number of turns in the coil 6. There are eight turns in the coil 6, and there are eight core segments 22 in the magnetic core 2. In an alternative embodiment, number of core segments differs from number of turns in the coil.

When seen from the direction of the choke axis 4, the choke depicted in FIG. 1 has a general form of an octagon. In an alternative embodiment a choke has a general form of a convex regular polygon, wherein number of turns in the coil is equal to number of edges in the convex regular polygon. The polygon shape simplifies manufacturing of the choke especially in embodiments where an outer section of the coil is made from sheet material. Planar side faces of the coil can be formed from sheet material without any need to modify profile of the sheet material. Instead, simple bends are sufficient to provide the polygon shape. However, in alternative embodiments a general shape of a choke differs from general form of a convex regular polygon. For example, a circular shape is possible.

Each intermediate sheet 242 is adapted to electrically insulate adjacent turns of coil from each other. Each intermediate sheet 242 is made of electrically insulating material. On end faces of the choke, lateral distance between adjacent turns of coil is substantially the same as thickness of an intermediate sheet 242 between the adjacent turns of coil.

Short lateral distance between adjacent turns of coil facilitates low resistance of the coil because it enables large width for the turns of coil, and therefore large cross-section for the turns of coil. Herein, an end face of the choke is a face that defines a plane perpendicular to the choke axis 4.

FIG. 1 shows that on a peripheral face 688 of the coil 6 each turn of the coil extends in a direction which is in an angle relative to direction of the choke axis 4, such that the turn of the coil advances in the direction of the perimeter. Therefore, on the peripheral face 688 a border 7 between adjacent turns of coil is oblique relative to the choke axis 4, and the border 7 cannot be insulated by the planar intermediate sheet 242. The peripheral face 688 of the coil 6 is the face that extends between the end faces, and connects them together. General direction of the peripheral face 688 is parallel to the choke axis 4.

In an alternative embodiment each turn of a coil advances in the direction of perimeter at end faces of the choke, and each turn of the coil extends parallel to the choke axis on peripheral face of the coil. Such a design provides shorter length for the coil compared with the structure shown in FIG. 1.

In an embodiment, a choke is covered with moulding resin in order to improve protection class of the choke. For example, covering the choke of FIG. 1 with resin provides IP55 protection. Referring to FIG. 2, moulding resin can be injected between the outer casing 808 and the coil 6. The outer casing 808 is made of electrically insulating material.

The choke of FIG. 1 has been designed such that it does not require any resin coating in order to electrically insulate turns of coil 6 from each other. However, covering the choke of FIG. 1 with moulding resin improves electrical insulation between adjacent turns of coil 6 on the peripheral face 688 of the coil 6 since resin is better electrical insulating material than air.

A choke according to present invention can be used as a direct current choke. Alternatively, a choke according to present invention can be used as a low frequency alternating current choke, wherein the low frequency alternating current choke is adapted to be connected to an alternating current source whose frequency is less than or equal to 60 Hz.

Figure 3:
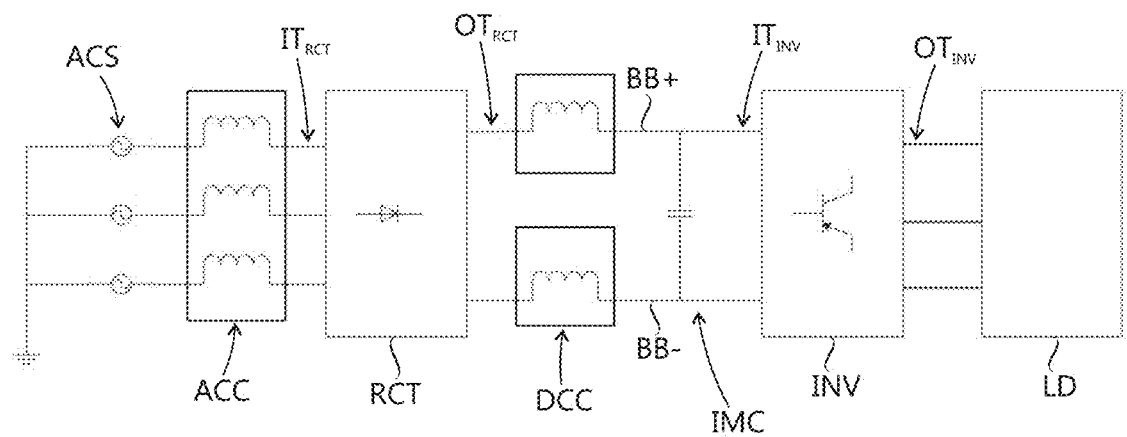
FIG. 3 shows a converter assembly comprising chokes according to FIG. 1.

FIG. 3 shows a converter assembly comprising a rectifier RCT, an inverter INV, an intermediate direct current circuit IMC, and an alternating current choke ACC. The rectifier RCT has an alternating current input $IT_{RCT}$ and a direct current output $OT_{RCT}$. The inverter INV has a direct current input $IT_{INV}$ and an alternating current output $OT_{INV}$. The intermediate direct current circuit IMC comprises a direct current choke DCC.

The alternating current input $IT_{RCT}$ of the rectifier RCT is connected to an alternating current source ACS through the alternating current choke ACC. The alternating current source ACS is a three-phase current source whose frequency is 50 Hz. The alternating current choke ACC is a three-phase choke comprising three chokes according to FIG. 1.

The direct current output $OT_{RCT}$ of the rectifier RCT is connected to the direct current input $IT_{INV}$ of the inverter INV through the intermediate direct current circuit IMC. The direct current choke DCC comprises two chokes according to FIG. 1, such that one of the chokes is connected in series with a positive busbar BB+ of the intermediate direct current circuit IMC, and the other is connected in series with a negative busbar BB− of the intermediate direct current circuit IMC.

The alternating current output $OT_{INV}$ of the inverter INV is a three-phase output. The alternating current output $OT_{INV}$ of the inverter INV is connected to a load LD.

Use of a choke according to present invention is not limited to converters discussed above. In an alternative embodiment a choke according to present invention is used in a DC chopper.

It will be obvious to a person skilled in the art that the inventive concept can be implemented in various ways. The invention and its embodiments are not limited to the examples described above but may vary within the scope of the claims.

The invention claimed is:

1. A choke comprising:
   a magnetic core having a centre line that forms a closed loop, the choke has a choke axis around which the magnetic core is located, the choke axis extends perpendicular to the closed loop formed by the centre line of the magnetic core; and
   a coil wound around the magnetic core, the coil is made of material having high electrical conductivity, the coil has a plurality of turns, each of the turns has a width perpendicular to lengthwise direction of the turn, and a thickness perpendicular to both lengthwise direction of the turn and the width,
   wherein the coil has a cross-section whose shape varies along lengthwise direction of the coil, such that each turn has an inner portion and an outer portion whose width is greater than width of the inner portion, the outer portion is located further from the choke axis than the inner portion, and
   wherein the choke is a toroidal choke, and
      the coil comprises a plurality of first coil sections and a plurality of second coil sections, the plurality of first coil sections and the plurality of second coil sections alternate along a lengthwise direction of the coil such that successive coil first and second sections are electrically conductively connected to each other, and
      a cross-section of each first coil section has a different shape than a cross-section of each second coil section,
      wherein an outermost portion of the coil is formed by portions of the plurality of first coil sections, and each first coil section is formed by a bent sheet material, and each second coil section is formed by a bar.

2. The choke according to claim 1, wherein the width of the outer portion is at least double compared with the width of the inner portion.

3. The choke according to claim 2, wherein the width of the outer portion is at least fourfold compared with thickness of the outer portion.

4. The choke according to claim 2, wherein a radial distance between the choke axis and the outermost portion of the coil is at least tenfold compared with radial distance between the choke axis and an innermost portion of the coil, wherein the radial distance is perpendicular to the choke axis.

5. The choke according to claim 1, wherein the width of the outer portion is at least fourfold compared with thickness of the outer portion.

6. The choke according to claim 5, wherein a radial distance between the choke axis and the outermost portion of the coil is at least tenfold compared with radial distance between the choke axis and an innermost portion of the coil, wherein the radial distance is perpendicular to the choke axis.

7. The choke according to claim 1, wherein a radial distance between the choke axis and an outermost portion of the coil is at least tenfold compared with radial distance between the choke axis and an innermost portion of the coil, wherein the radial distance is perpendicular to the choke axis.

8. The choke according to claim 1, wherein the cross-section of the first coil section has a form of a rectangle.

9. The choke according to claim 8, wherein cross-section of the second coil section has a form of a circle or a hexagon, the second coil section is located adjacent the choke axis, and extends parallel to the choke axis.

10. The choke according to claim 1, wherein successive coil sections are electrically conductively connected to each other by fixed connections.

11. The choke according to claim 1, wherein the magnetic core is a laminated magnetic core comprising a stack of sheets.

12. The choke according to claim 1, wherein the magnetic core has a plurality of core segments, and a plurality of core gaps, wherein permeability of material of the core segments is at least tenfold compared to permeability of material of the core gaps, and each of the plurality of core gaps is located between adjacent core segments in the direction of the centre line.

13. The chock according to claim 12, wherein each of the plurality of core gaps comprises an intermediate sheet made of material having low permeability, each of the intermediate sheets defines a gap plane between adjacent core segments, the centre line intersections each gap plane such that at the intersection the centre line is parallel to a normal of the gap plane.

14. The choke according to claim 12, wherein number of the core segments is equal to number of turns in the coil.

15. The choke according to claim 1, wherein the number of turns in the coil is between four and fourteen.

16. A converter assembly comprising:
a rectifier having an alternating current input adapted to be connected to an alternating current source whose frequency is less than or equal to 60 Hz; and
an alternating current choke connected to the alternating current input of the rectifier,
wherein the alternating current choke is the choke according to claim 1.

17. A converter assembly comprising:
a rectifier having an alternating current input adapted to be connected to an alternating current source, and a direct current output;
an inverter having a direct current input and an alternating current output;
an intermediate direct current circuit connected to the direct current output of the rectifier, and to the direct current input of the inverter, the intermediate direct current circuit comprises a direct current choke,
wherein the direct current choke is the choke according to claim 1.

* * * * *